United States Patent
Chevroulet

(10) Patent No.: US 8,259,058 B2
(45) Date of Patent: Sep. 4, 2012

(54) METHOD AND DEVICE FOR CONTROLLING THE BACKLIGHTING OF A FLAT SCREEN

(75) Inventor: Michel Chevroulet, Neuchatel (CH)

(73) Assignee: Semtech International AG, St. Gallen (CH)

(*) Notice: Subject to any disclaimer, the term of this patent is extended or adjusted under 35 U.S.C. 154(b) by 1090 days.

(21) Appl. No.: 12/171,022

(22) Filed: Jul. 10, 2008

(65) Prior Publication Data

US 2009/0015542 A1    Jan. 15, 2009

(30) Foreign Application Priority Data

Jul. 12, 2007  (EP) .................................. 07112357

(51) Int. Cl.
*G09G 3/36*  (2006.01)
(52) U.S. Cl. .............. 345/102; 345/76; 345/82; 345/84; 345/204; 362/97.1
(58) Field of Classification Search .................. 345/102, 345/76–83, 104, 84, 204; 362/97.1–97.3
See application file for complete search history.

(56) References Cited

U.S. PATENT DOCUMENTS

| | | | |
|---|---|---|---|
| 6,466,196 B1 | 10/2002 | Isogawa et al. | |
| 6,750,842 B2 | 6/2004 | Yu | |
| 6,867,757 B1* | 3/2005 | Nakamura | 345/83 |
| 7,557,518 B2* | 7/2009 | Zagar et al. | 315/291 |
| 2002/0005861 A1 | 1/2002 | Lewis | |
| 2002/0130801 A1* | 9/2002 | Scott et al. | 341/143 |
| 2005/0128743 A1* | 6/2005 | Chuey et al. | 362/234 |
| 2007/0075886 A1* | 4/2007 | Sakura et al. | 341/143 |

FOREIGN PATENT DOCUMENTS

GB    2465194 A  *  5/2010

* cited by examiner

*Primary Examiner* — Lun-Yi Lao
*Assistant Examiner* — Sosina Abebe
(74) *Attorney, Agent, or Firm* — Blank Rome LLP

(57) ABSTRACT

Electronic circuit designed to control the level of lighting produced by light diodes in a flat screen. The circuit uses a PDM modulator in order to generate a control signal (Vc) with a number of pulses by period that depends on the desired level of lighting. The advantage is to reduce the energy in the low frequencies.

15 Claims, 2 Drawing Sheets

METHOD AND DEVICE FOR CONTROLLING THE BACKLIGHTING OF A FLAT SCREEN

CLAIM OF PRIORITY

This application claims the benefit of and priority to commonly owned European Patent Application EP07112357, filed Jul. 12, 2007, the disclosure of which is hereby incorporated by reference herein.

FIELD

The present invention relates generally to a method and a device for controlling the backlighting of a flat screen.

INTRODUCTION

Liquid crystal displays do not produce light by themselves. They thus require a source of light to light them and allow them to be read even if the surrounding lighting conditions are less than optimal. For this purpose, many devices with flat screens, including mobile phones, calculators, digital watches, computer or television screens, for example, use a backlighting device with neon tubes or, more recently, networks of light emitting diodes (LEDs) behind the screen.

It is often desirable to be able to adjust the level of lighting produced by the backlighting system. The optimum light power depends notably on surrounding light conditions, on the user's preferences, on the displayed contents, etc. Light sources are thus generally powered through an electronic circuit that allows the supplied current to be varied.

For this purpose, the prior art circuits most often use pulse width modulation (PWM). Examples of PWM circuits for controlling the backlighting of screens are described notably in US2002 0005861, U.S. Pat. No. 6,750,842 or U.S. Pat. No. 6,466,196. U.S. Pat. No. 6,867,757 proposes to use an independent PWM circuit for the red, green or blue LEDs in order to control the color of the emitted light. The content of these documents is herewith incorporated by reference.

The possible resolution with PWM-type module is however limited. Certain LEDs and certain LED control circuits require pulses of a minimum duration of 10 microseconds. The maximum refreshing is however 2.5 ms (corresponding to a frequency of 200 Hz) in order to avoid flickering. In practice, only 8 bits can thus be used for encoding at most 256 levels of lighting, which is insufficient.

Greater resolution requires shorter base pulses, which are incompatible with certain light diodes or with certain LED control circuits, and/or longer refreshing periods that cause flickering.

Furthermore, the PWM modulation produces considerable current peaks, notably at low frequency, which interfere with the power supply of the device. More seriously, the energy of a PWM signal is concentrated on the low frequencies, as illustrated in FIG. 1 which shows the energy distribution as a function of the frequency. These current variations at low frequency produce movements of dust particles or of small parts that generate an audible noise. Furthermore, these low frequency energy fluctuations cause visible flickering, especially if it interferes with the displayed video signal.

SUMMARY

One aim of the present invention is to propose a circuit and a method for backlighting control free from the limitations of the known circuits and methods.

A summary of sample aspects of the disclosure follows.

According to some aspects, the disclosure relates to a LED control method and circuit by means of a PDM (Pulse Density Modulation)-type signal, i.e. of a signal modulated by pulse density, for example with the aid of a sigma-delta modulator.

When used for backlighting flat panels displays, this modulation scheme offers notably the advantage of reducing the parasite energy in the low frequencies, and thus to minimize both the flickering and the noise problems.

BRIEF DESCRIPTION OF THE DRAWINGS

Examples of embodiments of the invention are indicated in the description illustrated by the attached figures, where.

EXAMPLES OF EMBODIMENTS OF THE INVENTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways.

Figure 4:
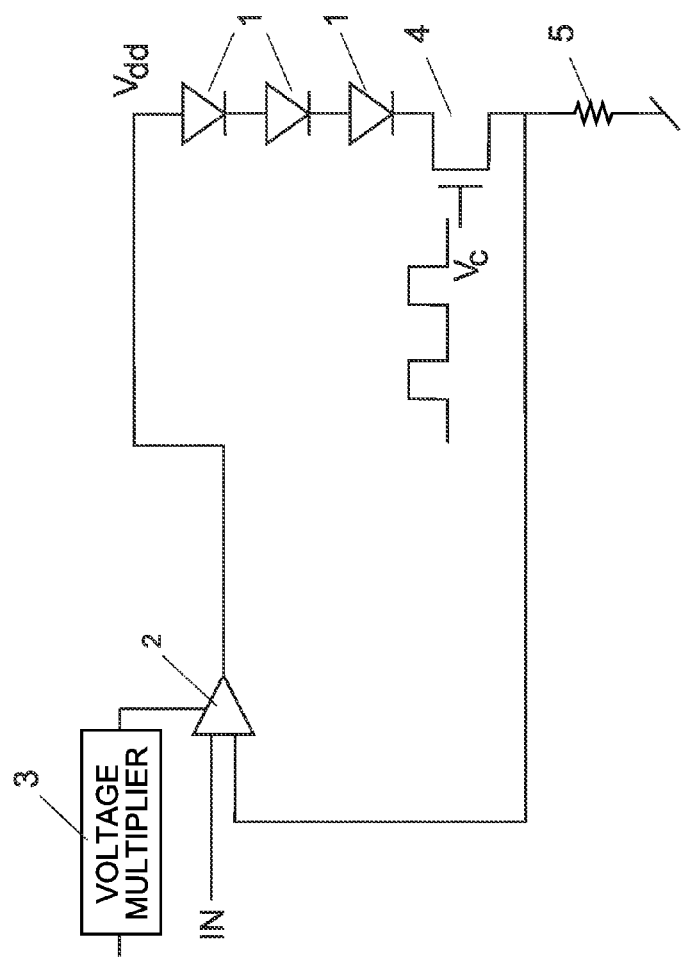
FIG. 4 illustrates an example of backlighting control circuit.

An example of electronic circuit for controlling the lighting in a liquid crystal display is illustrated by way of example in FIG. 4. The lighting is provided in this example by white light diodes 1. It is also possible to use colored light diodes, for example red, green and blue light diodes, and to control them separately in order to control the color of the light or of all of them together. The illustrated circuit comprises several light diodes it series controlled by a single signal. It is however also possible to connect the diodes differently or to use several series of diodes controlled separately. It is for example advantageous to interlace of mix several series of diodes in a phase-shifted fashion in time in order to minimize the flickering.

The light diodes 1 are powered by a voltage Vdd supplied by an amplifier 2 controlled by a signal IN and powered by a voltage multiplier 3. The lighting is interrupted by closing a switch 4 connecting the other extremity of the diode chain to the earth through a resistor 5. The switch is opened or closed with the aid of a command signal Vc modulated, in this invention, in PDM.

Figure 3:
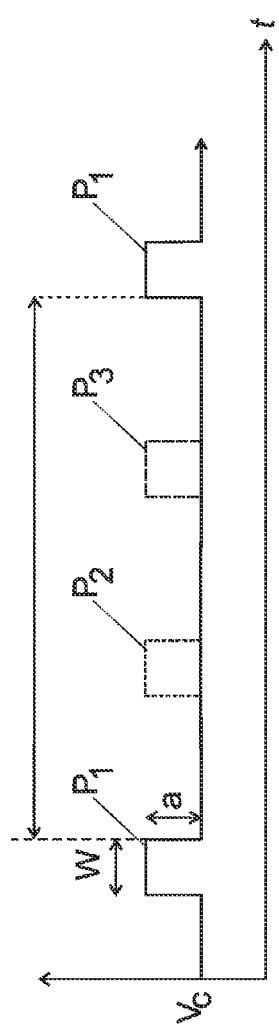
FIG. 3 illustrates diagrammatically the wave shape of a PDM-type signal used for controlling the light diodes in a backlighting system for a liquid crystal display.

FIG. 3 illustrates by way of example a PDM modulated signal Vc used for controlling the switch 4 in order to switch on or off the light diodes 1. PDM in this text means a form of modulation where the numeric values are encoded in the shape of pulse densities. Contrary to the PWM modulation, the pulses can be spaced instead of being all contiguous in a cycle.

The signal illustrated in FIG. 3 illustrates a period λ that is preferably equal to or lower than 2.5 milliseconds in order to avoid flickering. The value 0 (corresponding to zero lighting) is encoded by sending no pulse during this period. A value 1 corresponds to a single pulse p1 during the period. A doubling of the emitted light energy is achieved by sending a second pulse p2 separated from the pulse p1. By continuing this example, a value 3 is obtained by adding the non-contiguous third pulse p3 etc. and so on until the maximum illumination, which is achieved by sending a series of contiguous pulses over the whole period λ.

The pulses sent during each period are preferably equidistant, i.e. separated by equal duration intervals. This configuration allows the low frequency components to be minimized. It is however also possible to use non-equidistant pulses, for example in order to facilitate the making of the electronic circuit or to minimize the number of commutations when the lighting is incremented or decremented by one unit. Using pulses spaced by whatever intervals, notably by intervals different from whole multiples of w, also makes it possible to increase the liberty of choice for adding pulses and thus increase the number of possible pulses and the resolution.

In the case of a system comprising several chains of LEDs in series, for example several series of white LEDs or several series of LEDs of several colors, the pulses P1, Ps . . . Pn sent to the different series are preferably phase-shifted to as to ensure a distribution as regular as possible of the lighting during time. A simultaneous lighting or extinction of all the series of light diodes can thus be avoided as far as possible. Advantageously, the different series of light diodes are controlled by different command signals Vc generated by different PDM modulation circuits on a same integrated circuit. This advantageous arrangement allows the synchronization between the pulse trains sent to the different series of LEDs to be simplified.

The width w of all the pulses is preferably equal to the minimal control duration of the light diodes, for example 5 or 10 microseconds. It is also possible within the frame of the invention to vary this duration w, for example to increase it, in order to increase the resolution of the lighting system. It is also possible to use pulses of variable length during the same period.

It is also possible to vary the height a of the pulses, for example by modulating it to further increase the resolution. Similarly, the duration of the periods λ or the shape of the pulses can be controlled or modified. Furthermore, in one embodiment, it is possible to add to the signal Vc a noise, for example a constant noise or a white noise, in order to distribute the energy as fairly as possible according to the frequency and/or time.

Figure 1:
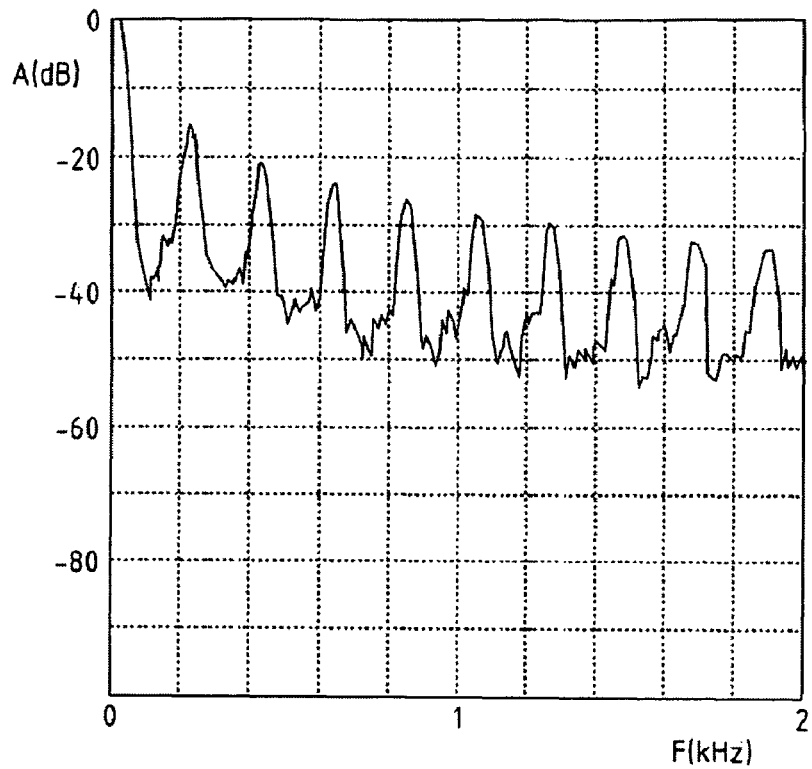
FIG. 1 illustrates the distribution of energy as a function of the frequency when the circuit is controlled with a PWM-type signal according to the prior art.
Figure 2:
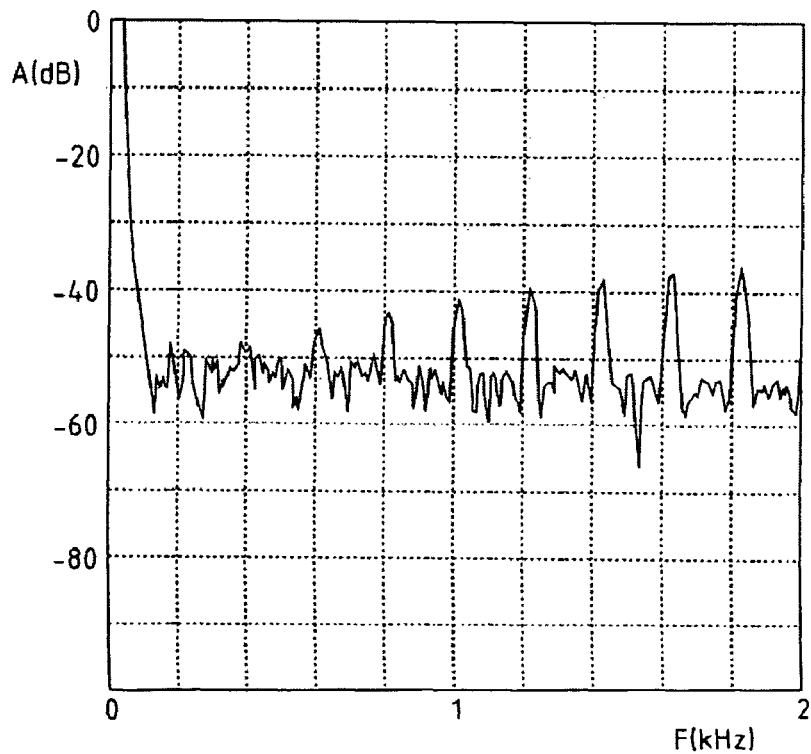
FIG. 2 illustrates the distribution of energy as a function of the frequency when the circuit is controlled with a PDM-type signal according to the invention.

FIG. 2 illustrates the distribution of energy emitted by the diodes as a function of the frequency. By comparison with FIG. 1 corresponding to a PWM modulation (with contiguous pulses), one will observe that the PDM modulation allows the amplitude of the low frequency components to be reduced. It is thus possible to avoid problems of flickering, notably at low lighting, and of noise.

The PDM modulated control signal Vc can be generated by a modulator, for example a delta-sigma modulator, which can be integrated to the circuit or to the chip that controls the light diodes. In a variant embodiment, this signal is generated by a first integrated circuit that supplies a PDM control signal, depending on one or several set values, to a second integrated circuit controlling the light diodes. In another embodiment, the light diodes are controlled through a first circuit generating a PWM control signal as a function of the set values, a second circuit converting this PWM signal into a PDM signal, and a third circuit controlling the light diodes.

The set values determining the lighting to be applied and thus the shape of the signal Vc depend for example on the surrounding lighting and/or on the lighting generated by the light diodes. These two lighting values can be measured by photo-receiving diodes that can be integrated to one of the circuits, for example to the first integrated circuit that defines the desired level of lighting. Other set parameters can be used, including for example the user's preferences or the temperature.

PDM control signals can also be generated by a suitable integrated circuit, for example by an ASIC or other suitable circuit. For example, in some aspects a single integrated circuit may implement the functionality of one or more of the illustrated components, while in other aspects more than one integrated circuit may implement the functionality of one or more of the illustrated components. In addition, PDM signals may also be generated by software, for example by suitable software code portions executed by a microprocessor so as to control the modulator and the modulation.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The invention claimed is:

1. A method for controlling the lighting level produced by light diodes in a device for backlighting a flat screen, the method comprising modulating current passing through said light diodes in PDM (pulse density modulation), wherein the number of emitted pulses depends on the desired lighting level, generating a pulse width modulation (PWM) control signal and converting said PWM control signal into a PDM signal for controlling said light diodes.

2. The method of claim 1, comprising a step of modulating the width of said pulses.

3. The method of claim 1, comprising a step of modulating the amplitude of said pulses.

4. The method of claim 1, comprising a step of generating said PDM control signal with the aid of a sigma-delta modulator.

5. The method of claim 1, wherein the pulses sent during a period are equidistant, whatever the value of the lighting.

6. The method of claim 1, wherein several phase-shifted control signals are used for controlling several series of LEDs.

7. The method of claim 1, wherein said control signal is generated with the aid of a software executed by a microcontroller.

8. An electronic circuit designed to control the level of backlighting produced by light diodes in a flat screen, comprising a a first circuit configured to generate a PWM (Pulse Width Modulation) control signal with a number of pulses (P) per period that depends on the desired level of backlighting, and a second circuit configured to convert an input PWM signal into a PDM (Pulse Density Modulation) control signal, said PDM control signal being applied to said light diodes.

9. The circuit of claim 8, comprising means for varying said number of pulses according to one or several set signals.

10. The circuit of claim 8, comprising photodiodes for varying said number of pulses as a function of the surrounding lighting and/or of the lighting produced by said light diodes.

11. The circuit of claim 8, wherein said pulses are equidistant.

12. The circuit of claim 8, wherein said pulses are modulated in their width.

13. The circuit of claim 8, wherein said pulses are modulated in their amplitude.

14. A system comprising: a liquid crystal display backlighting device with light diodes controlled by a PDM (Pulse Density Modulation) control signal with a number of pulses (P) per period that depends on the desired level of backlighting, a PWM modulator for generating a PWM (Pulse Width Modulation) control signal and a converter for converting the PWM control signal to the PDM control signal.

15. The system of claim 14, further comprising software code portions for controlling said PDM modulator.

* * * * *